(12) United States Patent
Thoresen

(10) Patent No.: US 8,878,373 B2
(45) Date of Patent: Nov. 4, 2014

(54) VARIABLE ELECTRICAL GENERATOR

(75) Inventor: Kent Thoresen, Drammen (NO)

(73) Assignee: Adaptive Generators AS, Drammen (NO)

( * ) Notice: Subject to any disclaimer, the term of this patent is extended or adjusted under 35 U.S.C. 154(b) by 0 days.

(21) Appl. No.: 13/636,575

(22) PCT Filed: Mar. 23, 2011

(86) PCT No.: PCT/NO2011/000099
§ 371 (c)(1),
(2), (4) Date: Nov. 26, 2012

(87) PCT Pub. No.: WO2011/119042
PCT Pub. Date: Sep. 29, 2011

(65) Prior Publication Data
US 2013/0062889 A1    Mar. 14, 2013

(30) Foreign Application Priority Data

Mar. 23, 2010  (NO) .................................. 20100443

(51) Int. Cl.
*F02B 63/04*     (2006.01)
*F03G 7/08*      (2006.01)
(Continued)

(52) U.S. Cl.
CPC ......... *H02P 25/22* (2013.01); *F05B 2220/7064* (2013.01); *H02P 27/16* (2013.01);
(Continued)

(58) Field of Classification Search
USPC .............. 310/46, 112, 156, 216, 268; 322/89; 290/1 R
See application file for complete search history.

(56) References Cited

U.S. PATENT DOCUMENTS 1,863,294 A * 6/1932 Bogia ............................. 310/46
2,993,159 A * 7/1961 Devol ....................... 318/400.39
(Continued)

FOREIGN PATENT DOCUMENTS

DE    102007054719 A1    1/2009
EP        0772735 A1     2/1996
(Continued)

OTHER PUBLICATIONS

International Search Report of parent Application No. PCT/2011/000099, 4 pages (dated Jul. 5, 2012).

*Primary Examiner* — Pedro J Cuevas
(74) *Attorney, Agent, or Firm* — Rothwell, Figg, Ernst & Manbeck PC

(57) ABSTRACT

A variable electrical generator (20) is operable to convert mechanical motion to electrical power. The generator (20) includes at least a stator element (60) and a rotor element (50) including coils (320) and magnets (90). The generator (20) includes a configuration of modules (80) including the coils (320) for generating wavelets (30) in response to the coils (320) interacting magnetically with the magnets (90), and a control arrangement (70) for combining the wavelets (30) for generating a composite synthesized power output (10) from the generator (20). A method of maintaining a variable generator (20) includes steps of: (a) determining operating status of modules (80) of the generator (20); (b) unplugging and replacing one or more defective modules (80) as identified in step (a). The generator (20) is susceptible to being used in renewable energy system, for example in a tidal water turbine, in a wind turbine, in association with an oscillating wind vane, in association with an ocean float, in a hydroelectric turbine, in a steam turbine.

15 Claims, 14 Drawing Sheets

(51) Int. Cl.
  *H02K 7/18* (2006.01)
  *H02P 27/16* (2006.01)
  *H02K 21/12* (2006.01)
  *F03D 9/00* (2006.01)
  *H02K 11/00* (2006.01)
  *H02P 25/22* (2006.01)
  *H02K 1/18* (2006.01)
  *F03B 13/12* (2006.01)
  *H02P 9/48* (2006.01)
  *H02K 7/20* (2006.01)
  *H02K 17/44* (2006.01)
  *H02K 21/24* (2006.01)
  *H02K 21/22* (2006.01)
  *H02P 9/00* (2006.01)
  *H02K 21/14* (2006.01)

(52) U.S. Cl.
  CPC .............. *H02K 21/12* (2013.01); *H02K 21/24* (2013.01); *F03D 9/002* (2013.01); *H02K 11/0073* (2013.01); *Y02E 10/38* (2013.01); *H02K 21/22* (2013.01); *H02P 2009/003* (2013.01); *H02K 1/18* (2013.01); *Y02E 10/725* (2013.01); *F03B 13/12* (2013.01); *H02K 21/14* (2013.01); *H02K 2213/12* (2013.01); *H02P 2009/004* (2013.01); *H02P 9/48* (2013.01)
  USPC ............. 290/1 R; 310/112; 310/268; 310/46; 322/89

(56) References Cited

U.S. PATENT DOCUMENTS

| | | | | |
|---|---|---|---|---|
| 3,452,229 A * | 6/1969 | Pimlott, Jr. et al. | ........... | 310/168 |
| 3,832,581 A * | 8/1974 | Hoffmann et al. | ............... | 310/46 |
| 4,211,945 A * | 7/1980 | Tawse | ........................... | 310/112 |
| 4,358,693 A * | 11/1982 | Palmer et al. | .................. | 310/46 |
| 4,360,753 A * | 11/1982 | Shannon | ........................ | 310/93 |
| 4,486,675 A * | 12/1984 | Albert | ............................ | 310/46 |
| 4,551,645 A * | 11/1985 | Takahashi et al. | .............. | 310/46 |
| 4,578,610 A * | 3/1986 | Kliman et al. | ........... | 310/156.35 |
| 4,605,873 A * | 8/1986 | Hahn | ...................... | 310/154.06 |
| 4,794,293 A * | 12/1988 | Fujisaki et al. | ............... | 310/268 |
| 5,245,238 A * | 9/1993 | Lynch et al. | .................. | 310/116 |
| 5,396,140 A * | 3/1995 | Goldie et al. | ................. | 310/268 |
| 5,619,087 A | 4/1997 | Sakai | | |
| 5,731,649 A * | 3/1998 | Caamano | ............... | 310/216.047 |
| 5,814,914 A * | 9/1998 | Caamano | ............... | 310/216.047 |
| 5,903,082 A * | 5/1999 | Caamano | ............... | 310/216.001 |
| 5,982,070 A * | 11/1999 | Caamano | ............... | 310/216.047 |
| 5,982,074 A * | 11/1999 | Smith et al. | ................. | 310/254.1 |
| 5,986,378 A * | 11/1999 | Caamano | ............... | 310/216.047 |
| 6,049,197 A * | 4/2000 | Caamano | ........................ | 322/89 |
| 6,154,013 A * | 11/2000 | Caamano | ........................ | 322/89 |
| 6,259,233 B1 * | 7/2001 | Caamano | ........................ | 322/89 |
| 6,323,576 B1 * | 11/2001 | Applegate | .................... | 310/268 |
| 6,407,466 B2 * | 6/2002 | Caamano | .......................... | 290/52 |
| 6,455,969 B1 * | 9/2002 | Chen | ............................ | 310/114 |
| 6,476,511 B1 | 11/2002 | Yemm et al. | | |
| 6,486,640 B2 * | 11/2002 | Adams | ............................ | 322/59 |
| 6,605,883 B2 * | 8/2003 | Isozaki et al. | ............. | 310/49.42 |
| 6,794,783 B2 * | 9/2004 | Tu et al. | .................. | 310/156.32 |
| 6,849,984 B2 * | 2/2005 | Gallant | ........................... | 310/178 |
| RE38,939 E * | 1/2006 | Kessinger et al. | ............ | 310/268 |
| 7,105,972 B2 * | 9/2006 | Gallant | .................... | 318/400.31 |
| 7,525,228 B2 * | 4/2009 | Chuang et al. | ................. | 310/112 |
| 7,710,081 B2 * | 5/2010 | Saban et al. | .......................... | 322/89 |
| 7,777,391 B2 * | 8/2010 | Asano | ........................... | 310/268 |
| 7,808,142 B2 * | 10/2010 | Wise | ......................... | 310/156.32 |
| 7,888,839 B2 * | 2/2011 | Gabrys et al. | ................. | 310/266 |
| 7,960,948 B2 * | 6/2011 | Saban et al. | .......................... | 322/89 |
| 8,497,612 B2 * | 7/2013 | Minowa et al. | ................ | 310/113 |
| 8,575,806 B2 * | 11/2013 | Kuo et al. | ............... | 310/156.36 |
| 8,614,529 B2 * | 12/2013 | Ritchey | ........................... | 310/78 |
| 8,643,249 B2 * | 2/2014 | Post | ........................... | 310/309 |
| 2001/0022511 A1 * | 9/2001 | Adams | ............................ | 322/59 |
| 2002/0047455 A1 * | 4/2002 | Dhyanchand et al. | ........ | 310/211 |
| 2005/0127767 A1 * | 6/2005 | Gallant | ........................... | 310/113 |
| 2006/0022552 A1 * | 2/2006 | Zhu et al. | ..................... | 310/268 |
| 2008/0079400 A1 | 4/2008 | Lacaze | | |
| 2008/0103632 A1 * | 5/2008 | Saban et al. | ................. | 700/286 |
| 2010/0244599 A1 * | 9/2010 | Saban et al. | ........................... | 310/71 |
| 2010/0253085 A1 * | 10/2010 | Minowa et al. | ................. | 290/55 |
| 2014/0049285 A1 * | 2/2014 | Rodriguez | ............... | 324/765.01 |
| 2014/0077648 A1 * | 3/2014 | Brauer et al. | ................. | 310/152 |
| 2014/0091661 A1 * | 4/2014 | Ritchey | ........................... | 310/114 |
| 2014/0091663 A1 * | 4/2014 | Hazeyama et al. | ...... | 310/156.11 |
| 2014/0139161 A1 * | 5/2014 | Ueda | ........................... | 318/400.37 |
| 2014/0167708 A1 * | 6/2014 | Ritchey | ............................ | 322/90 |

FOREIGN PATENT DOCUMENTS

GB  2113488 A  8/1983
WO  WO 2007/016120 A2  2/2007

* cited by examiner

VARIABLE ELECTRICAL GENERATOR

This application is a 35 U.S.C. 371 National Phase Entry Application from PCT/NO2011/000099, filed Mar. 23, 2011, which claims the benefit of Norwegian Patent Application No. 20100443 filed on Mar. 23, 2010 in the Norwegian Intellectual Property Office, the disclosures of which are incorporated herein in their entirety by reference.

FIELD OF THE INVENTION

The present invention relates to variable electrical generators for converting mechanical rotational and/or displacement energy to electrical energy, for example to a generator which is operable to vary dynamically its electrical output as well as coping with dynamically changing mechanical input rotation and/or reciprocating speeds. Moreover, the present invention also relates to methods of operating these variable electrical generators. Furthermore, the present invention concerns methods of constructing these variable electrical generators. Additionally, the present invention relates to software products executable on computing hardware for implementing methods of the present invention.

BACKGROUND OF THE INVENTION

On account of depletion of fossil fuel reserves, as well as concerns of climate change resulting from anthropogenic activities, attention has been focused in recent years on renewable energy systems. Conventional approaches the electricity generation often involve of form of reservoir, for example a hydroelectric facility includes a water dam providing a steady stream of water which can be regulated via a water valve to drive a turbine, and a hot nuclear reactor core is capable of storing considerable thermal energy for providing a steady stream of steam under high pressure which can be regulated via a steam valve to drive a turbine. In contradistinction, many renewable energy systems driven by wind, tidal flows and ocean wave motion experience a wide range of motion amplitudes, motion velocities, motion frequencies and/or motion directions. Moreover, extreme weather conditions often result in a large dynamic range of motion at various times throughout a year. In consequence, energy pickoff from these renewable energy systems is often technically difficult to implement. A conventional approach to cope with these problems of energy pickoff is to employ hydraulic apparatus, for example hydraulic piston-cylinder pump apparatus as described in U.S. Pat. No. 6,476,511 B1 (Yemm et al.), or hydraulic pump apparatus as described in international PCT patent application WO 2007/016120A2. However, hydraulic systems are prone to wear, and are relatively energy inefficient on account of viscous drag occurring in hydraulic fluids employed therein.

As an alternative to employing hydraulic power pickoff, it is feasible to employ a variable speed generator. Several types of variable speed generators are known, but they are often very rough devices which are not really ideal for applications such as wind power or tidal energy production. Large wind turbines for electricity generation rotate with a fairly low rotation rate (rpm) and current generators designed for use with these turbines utilize either:
(i) a staged gear system between a wind turbine rotor and a generator, wherein rotational speed is controlled by adjusting wind turbine blade pitch; or
(ii) a large diameter generator directly coupled to a wind turbine rotor, wherein the generator is designed to operate at low rotation rates.

The output power from the generator is conventionally rectified and then phase formed via power electronics operating at high switching frequencies, for example at frequencies of several kHz. These approaches (i) and (ii) are relatively expensive to implement, especially in respect of electronic apparatus required to rectify and phase form the generated electrical power provided by the generator.

SUMMARY OF THE INVENTION

The present invention seeks to provide a variable electrical generator which is better adapted for coping with variable mechanical input speeds and various input rotation directions and/or linear movement directions.

The present invention seeks to provide an advanced form of variable electrical generator which is more suited to mass production whilst also providing large power generating performance and robust operation.

According to a first aspect of the present invention, there is provided a variable electrical generator as claimed in appended claim 1: there is provided a variable electrical generator for converting mechanical motion to electrical power, wherein the generator includes at least a stator element and a rotor element including coils and magnets, characterized in that the generator includes a configuration of modules including the coils for generating wavelets (30) in response to the coils interacting magnetically with the magnets, and a control arrangement for combining the wavelets for generating a composite synthesized power output from the generator.

The invention is of advantage in that the output can be rapidly dynamically adjusted by controlling a manner in which the wavelets are combined together to synthesize the output.

Optionally, in the generator, the modules are spatially collocated with their corresponding coils to provide power signal metamorphosis at an early stage within the generator. This collocation potentially avoids a need for expensive and complex high-frequency electronic switching units later which are conventionally employed to condition outputs from conventional generators to a form suitable to feed onto an electricity distribution grid. Optionally, the variable electrical generator is beneficially implemented so that the modules are operable to generate wavelets whose duration (d) is shorter than a duration of cycle (D) of an alternating waveform of the output from the generator. Conveniently, when constructing the generator, the stator includes coils and is arranged to remain substantially stationary in operation, and the rotor includes magnets and is arranged to rotate and/or reciprocate in operation relative to the stator to induce wavelet signals in the coils. Optionally, the variable electrical generator is implemented so that the modules are electrically coupled together in a two-dimension switching matrix including at least one series path for adding potentials and at least one parallel path for current preading for generating the output. Optionally, the variable electrical generator is implemented so that the modules are operable to switch between a nonconductive state, a shorted state, a negative wavelet state and a positive wavelet state when in operation in response to control signals provided from the control arrangement. Optionally, the control arrangement is distributed between a control unit external to the modules and microcontrollers present in the modules. Optionally, when implementing the variable electrical generator, the modules are coupled in communication with the control arrangement via an optical data highway. More optionally, when implementing the variable electrical generator, the optical data highway is operable to direct data selectively between the control arrangement and the modules by way of wavelength division multiplexing (WDM). More optionally, the variable electrical generator is implemented so that the modules are operable to communicate diagnostic signals regarding their operating status to the control arrangement, and to receive control signals from the control arrangement concerning timing information and/or polarity information in respect of their respective wavelets.

Optionally, the variable electrical generator is implemented so that the modules are arranged to be unplugged and plugged into their respective positions on the stator and/or rotor, for example for maintenance and/or repair purposes.

Optionally, the variable electrical generator is implemented so that the modules include solid state switching devices for switching at least half-cycles of induced electrical signals induced within the coils in operation for generating wavelets.

Optionally, the variable electrical generator is implemented so that the control arrangement includes an input for use as a reference when synchronizing and/or adjusting an amplitude and/or phase of the output during operation.

According to a second aspect of the invention, there is provided a module for use in a variable electrical generator pursuant of the first aspect of the invention, wherein the module includes a microcontroller for providing local control of the module, a coil coupled to a switching arrangement for generating wavelets under control of the microcontroller, and an optical communication interface for receiving control data for controlling the module and/or for communicating diagnostic information from the module.

According to a third aspect of the invention, there is provided a method of using a variable electrical generator for converting mechanical motion to electrical power, wherein the generator includes at least a stator element and a rotor element including coils and magnets, characterized in that the method includes:
(a) generating wavelets in a configuration of modules including the coils for generating wavelets in response to the coils interacting magnetically with the magnets; and
(b) using a control arrangement to combine the wavelets for generating a composite synthesized power output from the generator.

According to a fourth aspect of the invention, there is provided a renewable energy system for converting linear and/or rotating motion of mechanical apparatus into electrical energy, wherein the apparatus is operable to cause relative movement between a rotor and a stator of a variable generator pursuant to the first aspect of the invention for generating a power output from the system. Optionally, operation of the system is determined by diagnostic data generated by the variable generator. Optionally, the renewable energy system is implemented so that the mechanical apparatus includes at least one of: a tidal water turbine, a wind turbine, an oscillating wind vane, an ocean float, a hydroelectric turbine, a steam turbine.

According to a fifth aspect of the invention, there is provided a method of maintaining a variable generator, the generator being pursuant to the first aspect of the invention, the method including steps of:
(a) determining operating status of modules of the generator;
(b) unplugging and replacing one or more defective modules as identified in step (a).

According to a sixth aspect of the invention, there is provided a method of providing responsive load stabilization to an electrical distribution grid by using a variable electrical generator pursuant to the first aspect of the invention, the generator being coupled to the grid, characterized in that the method includes:

(a) sensing one or more parameters indicative of a degree of electrical loading being experienced by the grid;
(b) adjusting wavelet selection in the generator to absorb or inject electrical power into the grid so as to assist to stabilize the grid against deviations in voltage and/or frequency of said grid resulting from said degree of electrical loading.

It will be appreciated that features of the invention are susceptible to being combined in various combinations.

DESCRIPTION OF THE DIAGRAMS

Embodiments of the present invention will now be described, by way of example only, with reference to the following diagrams wherein.

Figure 9:
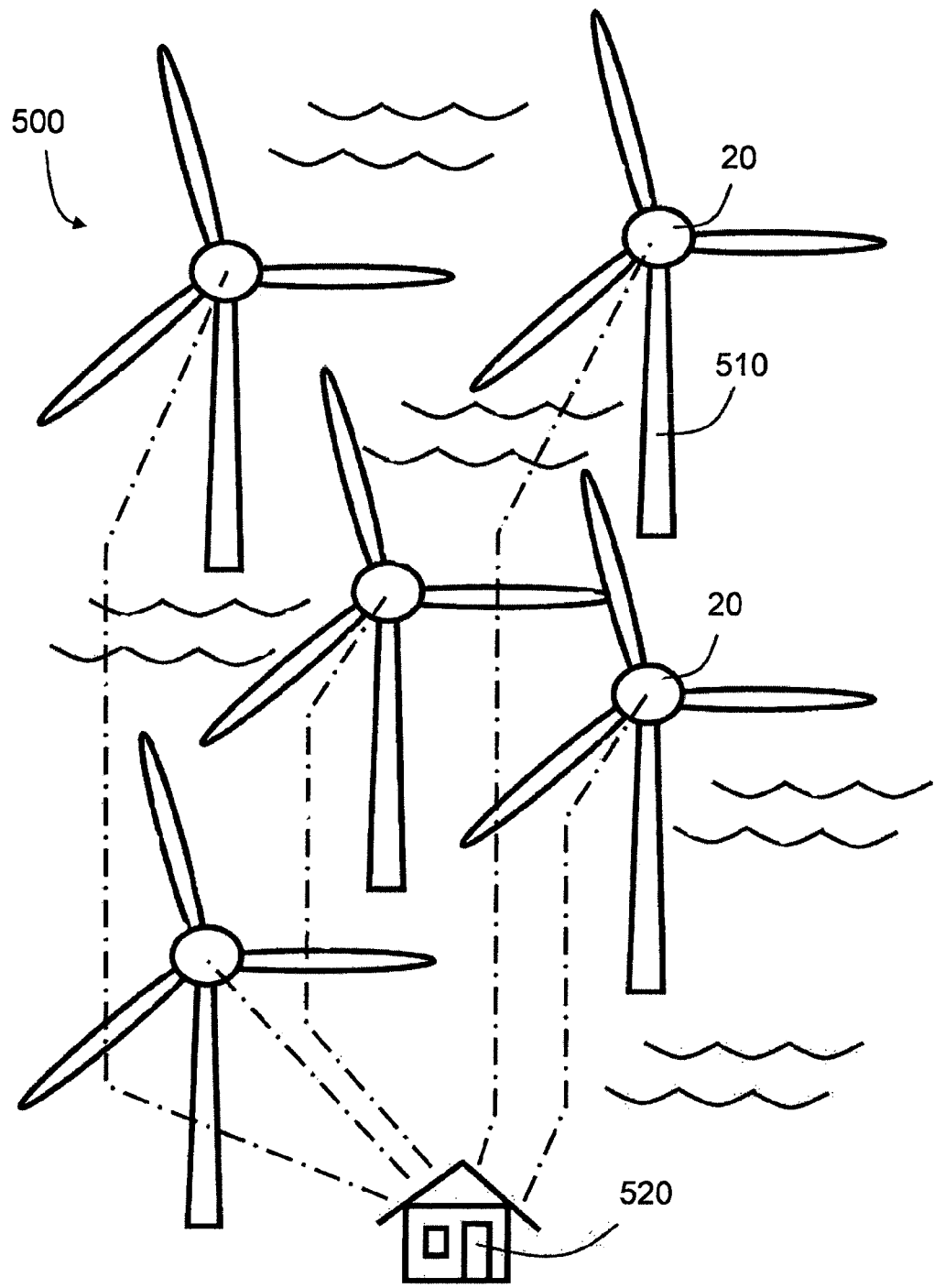
Figure 10:
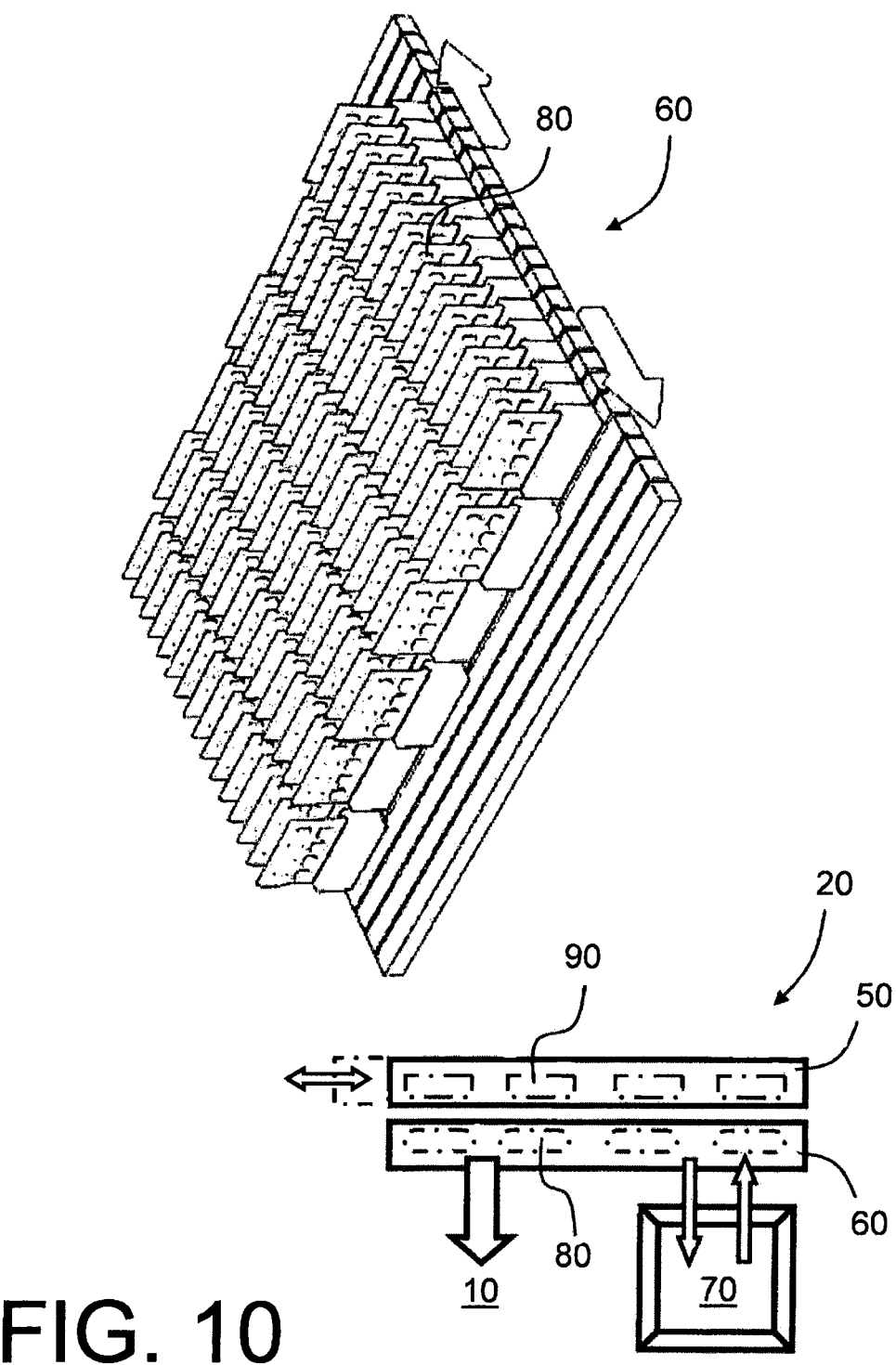

FIG. 9 is a schematic diagram of an offshore wind turbine system, namely a wind "farm", including a plurality of wind turbines equipped with variable generators pursuant to the present invention; and FIG. 10 is a schematic diagram of an embodiment of a generator pursuant to the present invention for converting linear motion, for example reciprocating linear motion, to electrical energy in a variable manner.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
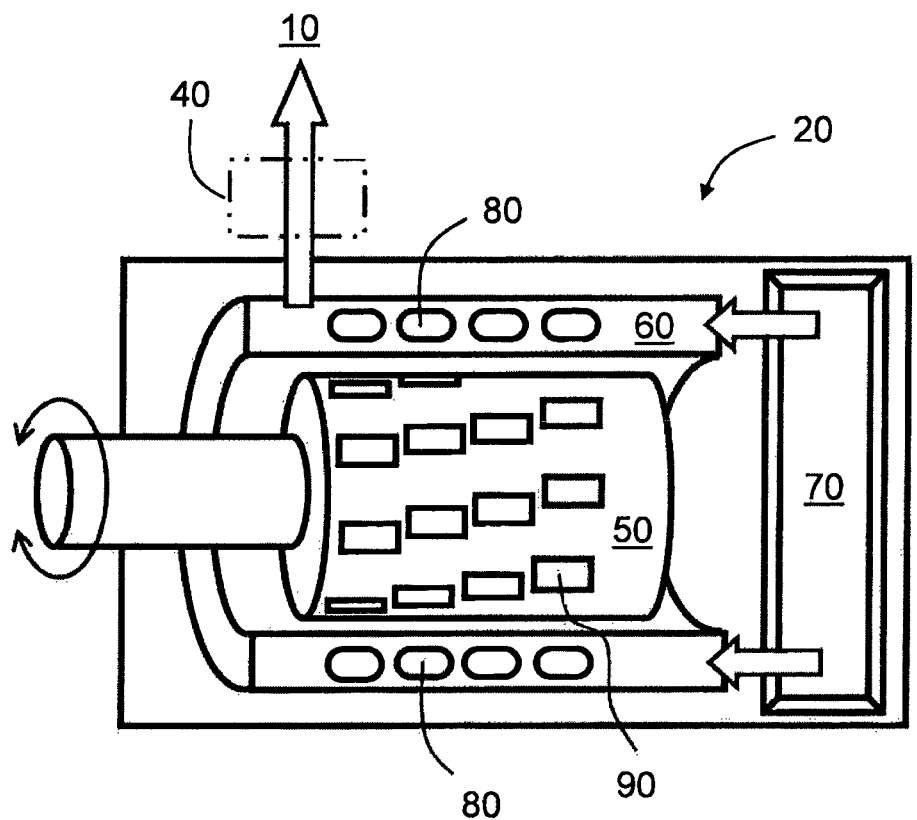
FIG. 1 is an illustration of an embodiment of a variable electrical generator pursuant to the present invention, and a representation of synthesis of an output waveform by combining wavelets in various combinations.
Figure 1:
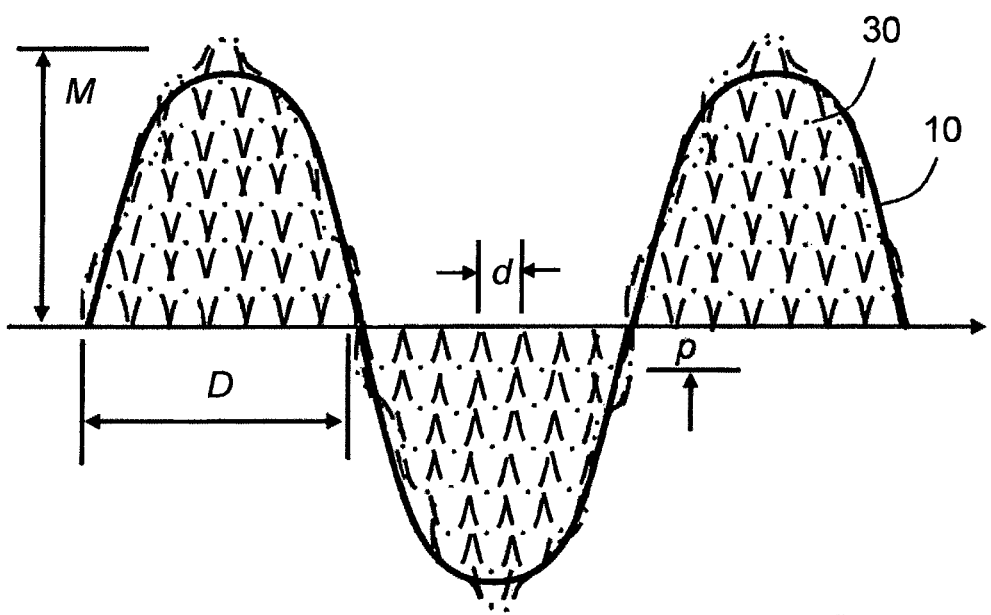

The present invention is based upon a concept which is illustrated in FIG. 1, namely that an alternating power output 10 provided from an electrical generator 20 is susceptible to being synthesized by selectively switching a large number of smaller wavelets 30 which have a magnitude p and a duration d which are considerably smaller and shorter respectively than a magnitude M and a duration D of the alternating power output 10 provided from the generator 20. If required, a filter 40, for example implemented by a combination of inductors and capacitors, may be employed to filter high-order harmonic signal components present in the output 10 from the generator 20. A benefit of this approach is that the wavelets 30 are capable of being switched rapidly in response to dynamically changing input rotation directions or rotation speeds of a rotor 50 of the generator 20. Moreover, mass-produced solid state electronic modules 80 can be employed which are dedicated to switching their respective wavelets 30. Moreover, the modules 80 are beneficially implemented to be individually controllable, for example via a general optical data bus from a control unit 70 operable to direct operation of the generator 10. Such a manner of operation is beneficial because failure of a few of the modules 80 does not disable operation of the generator 10 in general, but merely results in potentially a more coarsely synthesized output 10. Furthermore, the modules 80 can be mounted in a stacked arrangement along the rotor 50 and/or stator 60 for ensuring a more uniform and manageable potential gradient occurs in operation, thereby reducing any risk of electrical breakdown or flash-over. The aforementioned wavelets 30 are generated by employing relatively small magnetic poles and associated magnets 90 disposed around the rotor 50 and its associated stator 60 for generating the wavelets 30 at various different angular positions of the rotor 50 relative to the stator 60. Electrically insulating cooling fluid, for example synthetic silicone oil or forced air, is circulated through the modules 80 to remove heat generated therein when in operation. Optionally, the rotor 50 and the stator 60 have fitted thereto an angular sensor, for example an optical encoder, for providing the control unit 70 with an indication of the rotation angle of the rotor 50 relative to the stator 60. In operation, the generator in FIG. 1 optionally receives an external synchronization signal S, and is operable to couple wavelets generated by the modules 80 at appropriate times to generate the output 10 synchronized to the signal S. However, it will be appreciated that the wavelets can be switched in such a manner that the generator of FIG. 1 is also capable of generating a direct current (DC) output 10 as well as an alternating current (AC) output 10.

The generator 20 is capable of being employed in a direct drive manner, for example where it is directly coupled to, or even integral with, a turbine. Alternatively, the generator 20 may be coupled via a gearbox, for example a fixed-ratio gearbox, to a turbine. Thus, the generator 20, also referred to as a variable voltage generator "VVG", is capable of operating as a direct-drive apparatus. The generator 20 may be specifically designed for direct-drive applications where input speed and torque to the generator 20 varies considerable, for example in response to changing tidal or wind conditions. Example applications for the generator 20 can be on-shore or off-shore wind turbines or underwater tidal turbines. Moreover, the generator 20 is also susceptible to being employed in free-cylinder reciprocating combustion machines devoid of a crankshaft structure. The generator 20 of FIG. 1 will now be described in greater detail.

On account of its modular form of construction and operation, the generator 20 is intrinsically capable of providing several additional benefits. For example, the generator 20 is capable of adapting its operation between:
(a) a stand-alone mode of operation; and
(b) a coordinated mode of operation which allows the generator 20 to function in conjuncture with other units, thereby enabling highly robust systems to be constructed which are tolerant to multiple component failures within the generator 20. Such a degree of robustness renders the generator 20 ideal for renewable energy applications, for example in offshore wind turbine applications where high reliability is important on account of access for maintenance purposes being restricted, for example during stormy winter conditions. In operation, the generator 20 is capable of generating output at any desired frequency, overall waveform shape, voltage magnitude and phase relative to a reference signal; the generator 20 can even generate direct current (DC), thereby avoiding a need for rectification components external to the generator 20.

Although the wavelets 30 are illustrated in FIG. 1 as being in phase and of mutually of similar size, it will be appreciated that the generator 20 may be constructed so that the wavelets 30 have mutually different polarities, mutually different relative phases and mutually different magnitudes. Beneficially, the magnets 90 and their associated modules 80 are disposed in a spiral manner as illustrated in FIG. 1 to obtain various relative phases for the wavelets 30 to enable the control unit 70 to finely control the output 10, for example for synchronizing the output 10 to an electrical power distribution grid. The wavelets 30 can, for example, be implemented as a binary series of magnitude in a manner akin to a binary sequence 1, 2, 4, 8 . . . to enable the magnitude and form of the output 10 to be finely adjusted.

Figure 2A:
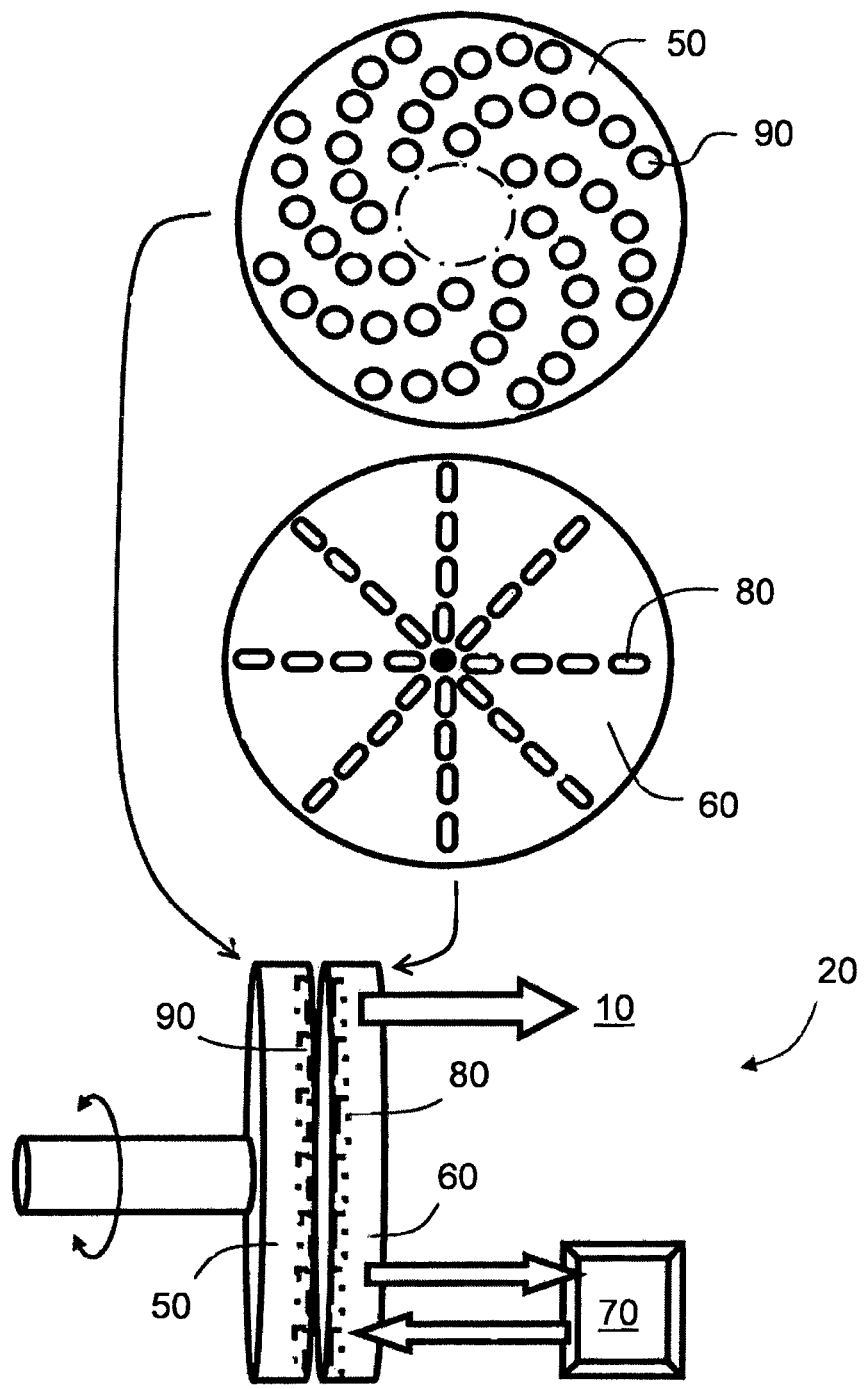
FIG. 2A is an illustration of an embodiment of a variable electrical generator pursuant to the present invention, wherein the generator is implemented in a wide-diameter form.
Figure 2B:
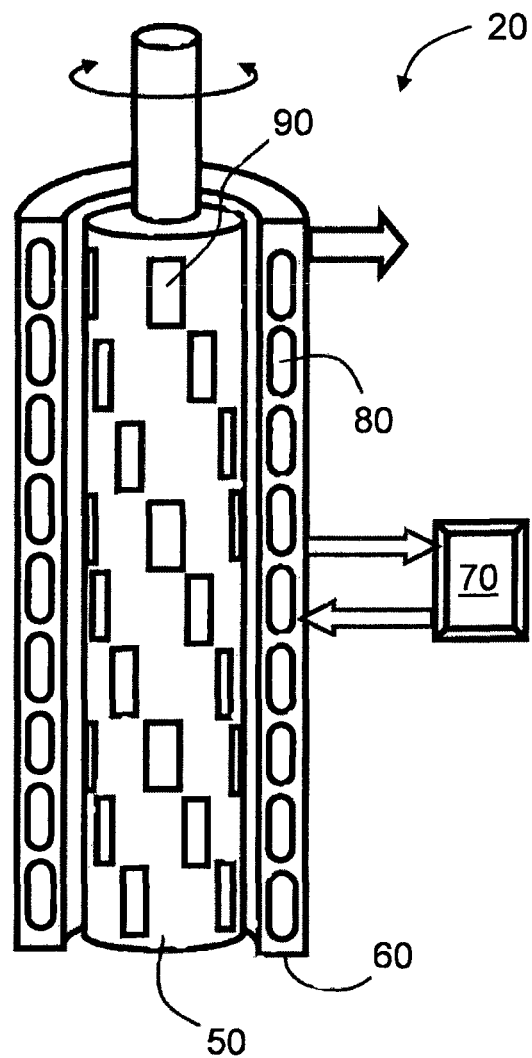
FIG. 2B is an illustration of an embodiment of a variable electrical generator pursuant to the present invention, wherein the generator is implemented in a long narrow-diameter form.
Figure 2C:
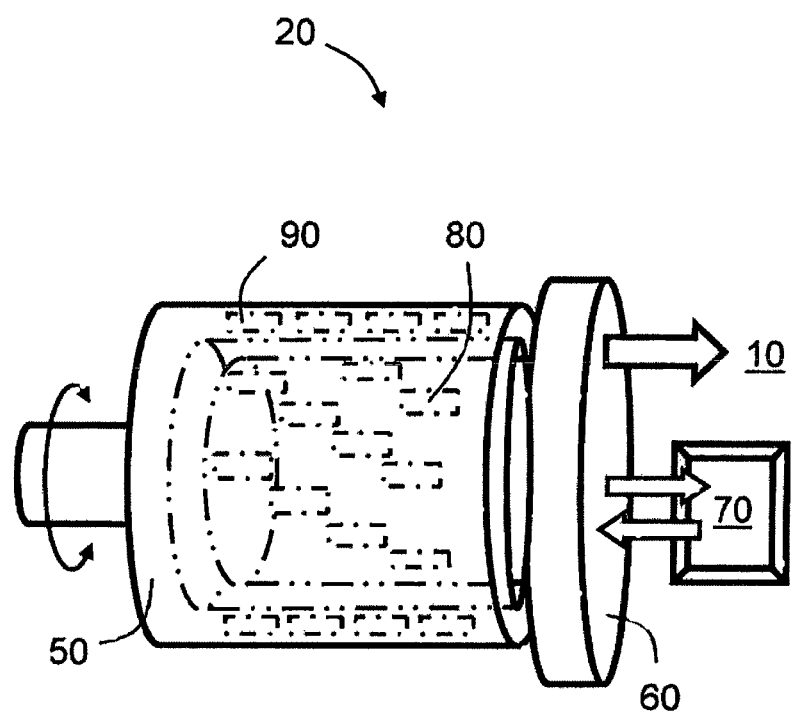
FIG. 2C is an illustration of an embodiment of a variable electrical generator pursuant to the present invention, wherein the generator is implemented to include a central stationary stator with associated modules, and a rotatable rotor circumferentially surrounding the stator.

The generator 20 can be constructed to utilize a wide diameter configuration, for example in a pancake-type arrangement as illustrated in FIG. 2A. In order to be regarded as a "wide diameter" generator, the diameter of the rotor 50, similarly the stator 60, should be in an order of at least 1.5 times greater than its axial active length. Alternatively, the generator 20 can be implemented in a long but small diameter configuration as illustrated in FIG. 2B. In order to be regarded to be a "long rotor" generator, the rotor 50 is beneficially in an order of at least 1.5 times longer than its diameter, with the stator 60 implemented along a length of the rotor 60. In FIG. 2C, the generator 20 is implemented such that rotor 50 encloses the stator 60, wherein the stator 60 is stationary in operation and central to the generator 20. The modules 80 are each beneficially implemented as an integrated subunit with one or more associated pickup coils. Moreover, the modules 80 are beneficially arranged in several rows or spirals in respect of a rotating axis of the generator 20. The number of magnets 90 and coils of the modules 80 determines a generating power output capability of the generator 20. Moreover, the waveform output resolution of the generator 20 is beneficially adapted in each case to an intended range of operating speeds expected for the generator 20.

Conventional variable generator designs are operable to rectify power signals generated by generator pickup coils to generate a rectified output which is then phase-formed using power electronic components to produce a final output power signal having a desired frequency, phase and voltage magnitude. Such power electronic components are expensive, inflexible and cause much localized energy loss, namely "hotspots", which can result in a single point of critical failure. The power electronic components are usually implemented as high-frequency switching devices, for example power field-effect-transistors (FETS), thyristors, Darlington transistors and similar, capable of chopping the rectified signal, for example in a pulse-width-modulated (PWM) manner, to synthesize an output power signal which is amplitude, frequency and phase adjusted.

In contradistinction, generators implemented pursuant to the present invention perform in quite a different manner in comparison to aforementioned conventional generator designs. Thus, conventional variable generators perform two separate operations of rectification of alternating coil signals to direct current state (DC), and then subsequent waveform generation using electronic devices to generate a synthesized output signal as conventional employed. Generators 20 ("VVS") pursuant to the present invention included a plurality of modules 80 for generating wavelets 30 which are then selectively combined by binary switching to synthesize an output power waveform. This approach pursuant to the present invention provides the following benefits:

(a) wavelet 30 switching can occur at a much lower frequency which reduces switching losses and thereby improves efficiency, and also enables lower-performance silicon switching devices to be utilized;

(b) loss of supply of one wavelet 30 does not cause catastrophic failure of the generator 20; in an event that one or more of the modules 80 become defective such that their wavelets 30 are not available for output waveform synthesis, the control unit 70 is operable to select amongst other available wavelets 30 to provide a next-best possible synthesis of the output 10.

An adaptive control system of the control unit 70 steers power flow within the generator 20 so that outputs of the individual coils 80 are re-arranged in cooperation with all the other coils 80 in real time to produce the desired output 10, irrespective of the input frequency as determined by a rotation rate of the rotor 50. Since control electronic components of each module 80 only deal with their own associated pickup coil 80, for example each pickup coil 80 having a maximum power in a range of 5 kW to 10 kW, considerable amounts of power within the generator 20 can be controlled and modulated with simple mass-produced off-the-shelf electronic switching components. Thus, generators 20 pursuant to the preset invention eliminate conventional rectification and phase forming stages of conventional generator systems, thereby providing cost savings, more efficient operation and more reliable operation.

Figure 3:
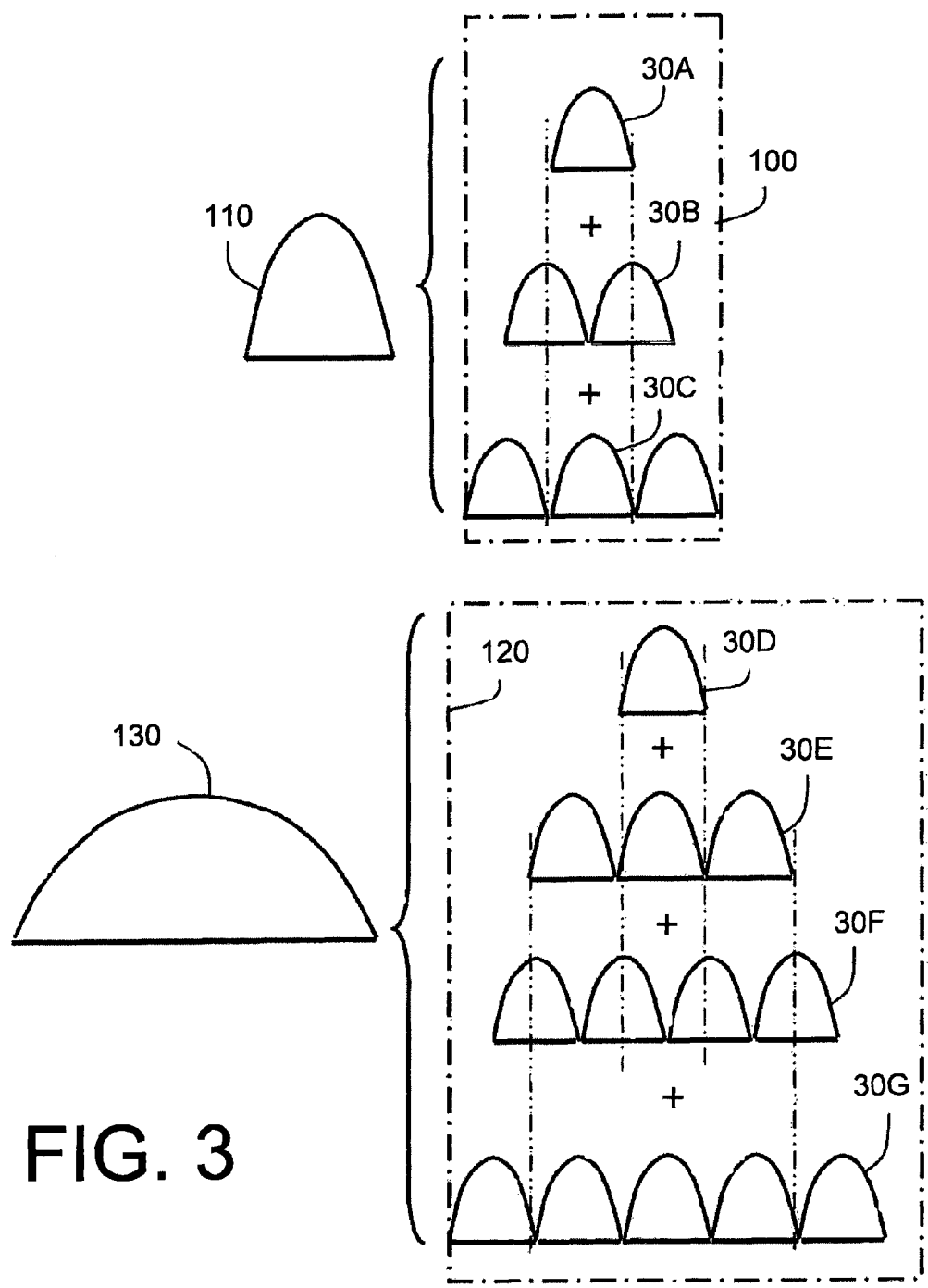
FIG. 3 is a further illustration of output waveform synthesis by using wavelets which are in phase and in quadrature phase for achieving an improved quality of synthesis, thereby reducing a need for output filtering to remove harmonic content present in the output from the generator.

In FIG. 3, there is shown a combination of wavelets 30 to synthesize sinusoidal output waveforms for the output 10, namely by employing wavelets 30 which are mutually in quadrature phase. An approximate half sinusoidal signal 110 is thus generated as illustrated at the top region of FIG. 3 by combining one in-phase wavelet 30A with two quadrature wavelets 30B and three in-phase wavelets, wherein the wavelets are of similar polarity. It is feasible to synthesize a half sinusoidal signal of longer relative duration by combining more wavelets 30D, 30E, 30F, 300 as illustrated at a bottom region of FIG. 3. By combining these individual wavelets, almost any range of frequencies, voltages and currents can b provided at the output 10, namely independently of the input frequency determined by rotation rate of the rotor 50, without the need to rectify or phase-form signals generated by the coils.

Figure 4:
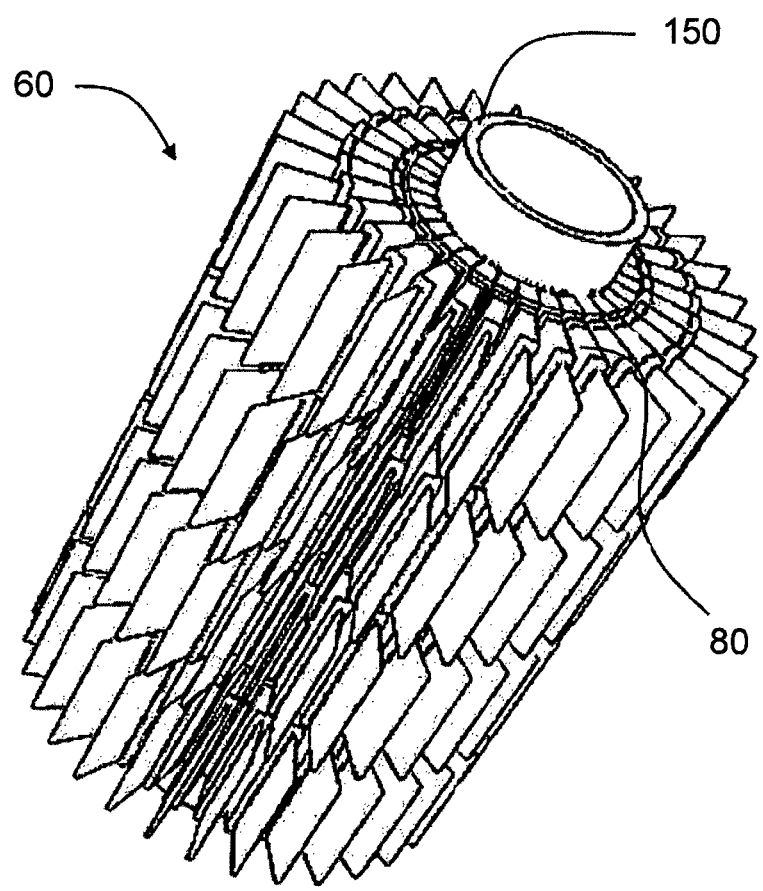
FIG. 4 is an illustration of a central stator of an embodiment of a variable electrical generator pursuant to the present invention.

In FIG. 4, a practical implementation for the stator 60 is shown, wherein the rotor 50 (not shown in FIG. 4) is disposed in a peripheral manner as illustrated in FIG. 2C; the stator 60 is thus beneficially stationary in operation, thereby rendering cable coupling to the stator 60 possible without a need to use slip-rings. It will be appreciated that the generator 20 experiences considerable mechanical stresses when designed to generate in an order of MegaWatts (MW) of electrical power such that the magnets 90 and the modules 80 need to be mechanically robust and properly mechanically supported, for example to withstand centrifugal forces. For example, the magnets 90 are beneficially fabricated from Neodynium materials and supported in a compliant polymer or rubber mount of the rotor 50 to spread forces to avoid snapping or fracture of the permanent magnets 90 in operation; for example, polyurethane bedding of the magnets 90 is optionally employed. The modules 80 are robustly mechanically supported as well as being provided with cooling. Furthermore, the modules 80 are beneficially stacked together in a manner to ensure a gradual potential gradient occurs in operation therealong; such potential distribution is especially important when the generator 20 is to provide the output 10 at a magnitude in an order of kilovolts (kV) to avoid any tendency to flash-over. The modules 80 are beneficially mounted onto an insulating central tube 150 through which forced air cooling or cooling liquid is circulated in operation; for example, electrically-insulating and substantially optically-transparent silicone oil is beneficially employed as a liquid coolant. The modules 80 are beneficially mounted onto axial vanes 160 projecting from the central tube 150, wherein the vanes 160 are in thermal communication with the central tube 150. Magnetic pole pieces 170, for example fabricated from laminate silicon steel, of the modules 80 are beneficially mounted in respect of the vanes which are both robust, able to resist stress, and yet offer a degree of flexibility to cope with mechanical shocks which could otherwise damage the generator 20. The modules 80 are beneficially mutually similar to enable the stator 60 to be fabricated from mass-produced items for reducing its cost. Moreover, when the generator 20 requires servicing, any defective modules 80 can be readily diagnosed and them subsequently unplugged from the vanes 160 and/or the central tube 150 and substituted with corresponding new functional modules 80. Beneficially, the modules 80 are provided with a shared optical communication highway, for example implemented in a manner akin to Ethernet, for enabling control signals to be sent from the control unit 70 to the modules 80 for controlling switching of the modules 80, and for conveying feedback signals from the modules 80 back to the control unit 70 indicative of operation of the modules 80. If required, optical wavelength division multiplexing (WDM) can be employed for different categories of control and feedback signals exchanged between the modules 80 and the control unit 70. Moreover, optical radiation conveyed via the optical highway can be used to provide power for control electronic components included in each of the modules 80, for example using power-generating photocells included in the modules, there providing electrical isolation. Use of optical radiation is of especial benefit because:

(a) it is relatively immune to electrical interference;

(b) it provides for relatively high communication data rates to and from the modules; and (c) it provides an intrinsic approach to electrical isolation between modules 80 which would not be possible in an alternative configuration wherein electrical control signals were employed.

Figure 5:
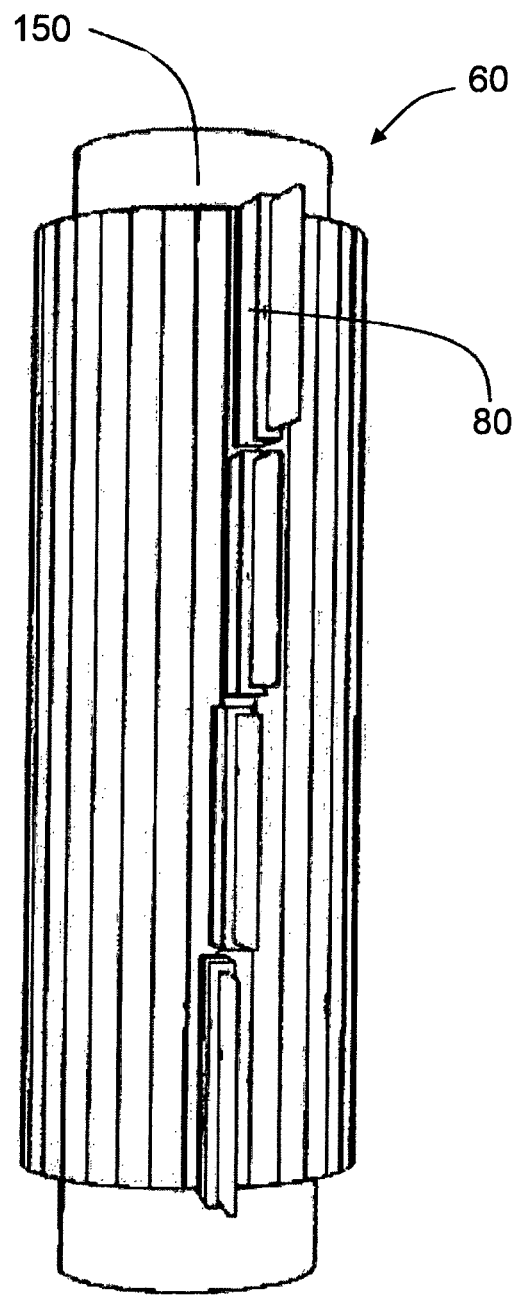
FIG. 5 is an illustration of a spiral disposition of modules along a stator of an embodiment of a variable generator pursuant to the present invention.

Optionally, the modules 80 are disposed in a slightly spiral manner onto the stator 60 as illustrated in FIG. 5 for enabling improved waveform synthesis to be achieved in operation with greater phase resolution by way of providing a range of wavelets 30 with mutually slightly differing phase characteristics.

Figure 6A:
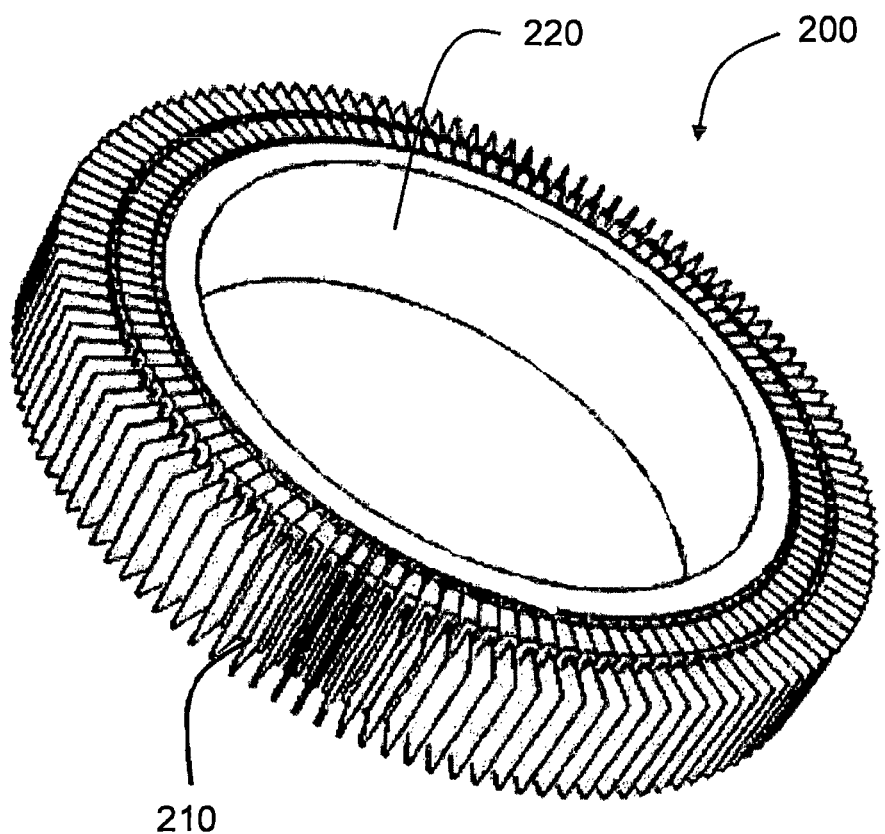
FIG. 6A is an illustration of a ring-type rotor element of a rotor of an embodiment of a generator pursuant to the present invention.

When a configuration for the generator 20 is employed as illustrated in FIG. 1, the rotor 50 is beneficially fabricated from a series of ring elements as indicated by 300 in FIG. 6A. Each ring element 200 includes permanent magnets 210, for example Neodynium ceramic permanent magnets, disposed around a ring-like support 220 which can be rigidly mounted to a supporting shaft in operation. The magnets 210 are implemented in a radial vane-like manner with air gaps therebetween as illustrated. Moreover, vane-like projections from the support 220 assist to support the magnets 210 mechanically which are subject to major stress when the generator 20 is in operation providing large quantities of output power, for example in an order of several hundred kW's, or even several MW's.

Figure 6B:
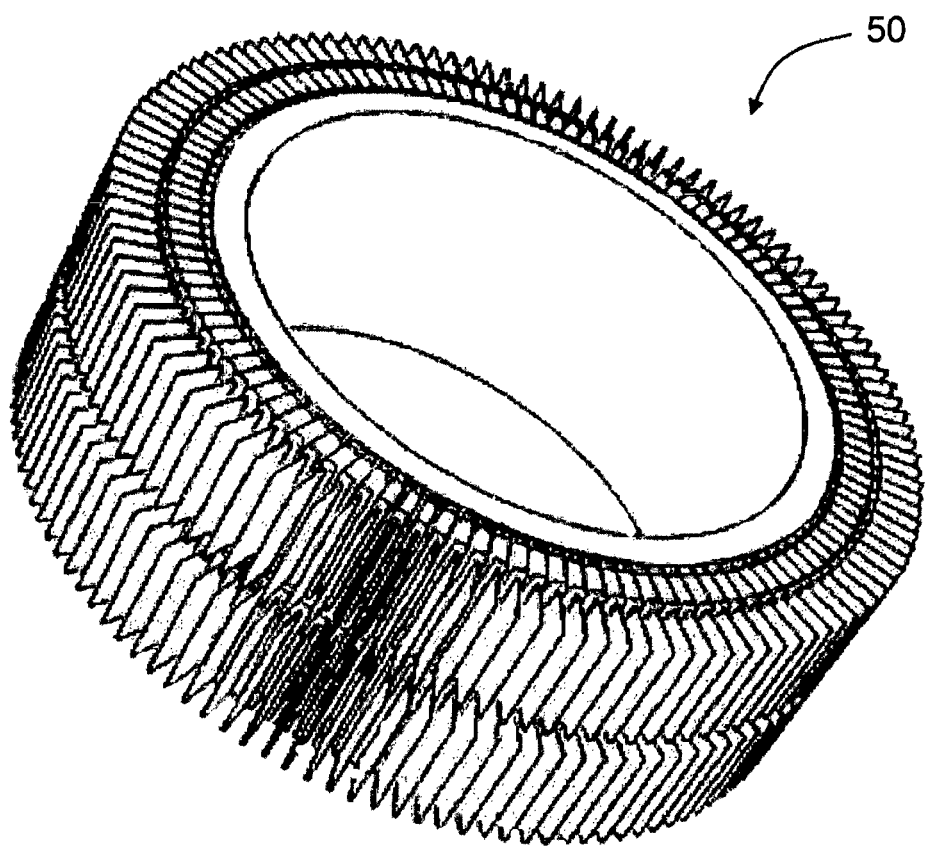
FIG. 6B is an illustration of a set of ring-type rotor elements arranged in a phase-offset manner, the rotor elements forming a part of a rotor of an embodiment of a generator pursuant to the present invention.

Several of the ring elements 220 can be mounted axially together with an angular displacement therebetween as illustrated in FIG. 6B for providing the control unit 70 with a greater choice of wavelets 30 which can be combined to generate the output 10. Thus, the rotor 50 is susceptible to being constructed from a multiple of ring elements 220 which are robustly assembled together. In an event that one or more of the elements 220 become damaged, for example their magnets 90 become fractured, they can be simply replaced in their entirety during routine maintenance of the generator 20. The ring elements 220 are beneficially constructed from one or more of: metal, carbon fiber, composite materials, plastics polymer materials, ceramic materials. The rotor 50 and the stator 60 are mounted together within a housing with an appropriate arrangement of bearings so that the rotor 50 is operable to rotate relative to the stator 60 to generate electrical power at the output 10. Mechanical and/or magnetic bearings and/or fluid bearings can be employed, depending upon application for the generator 20 and its designed power generating capacity.

Figure 7:
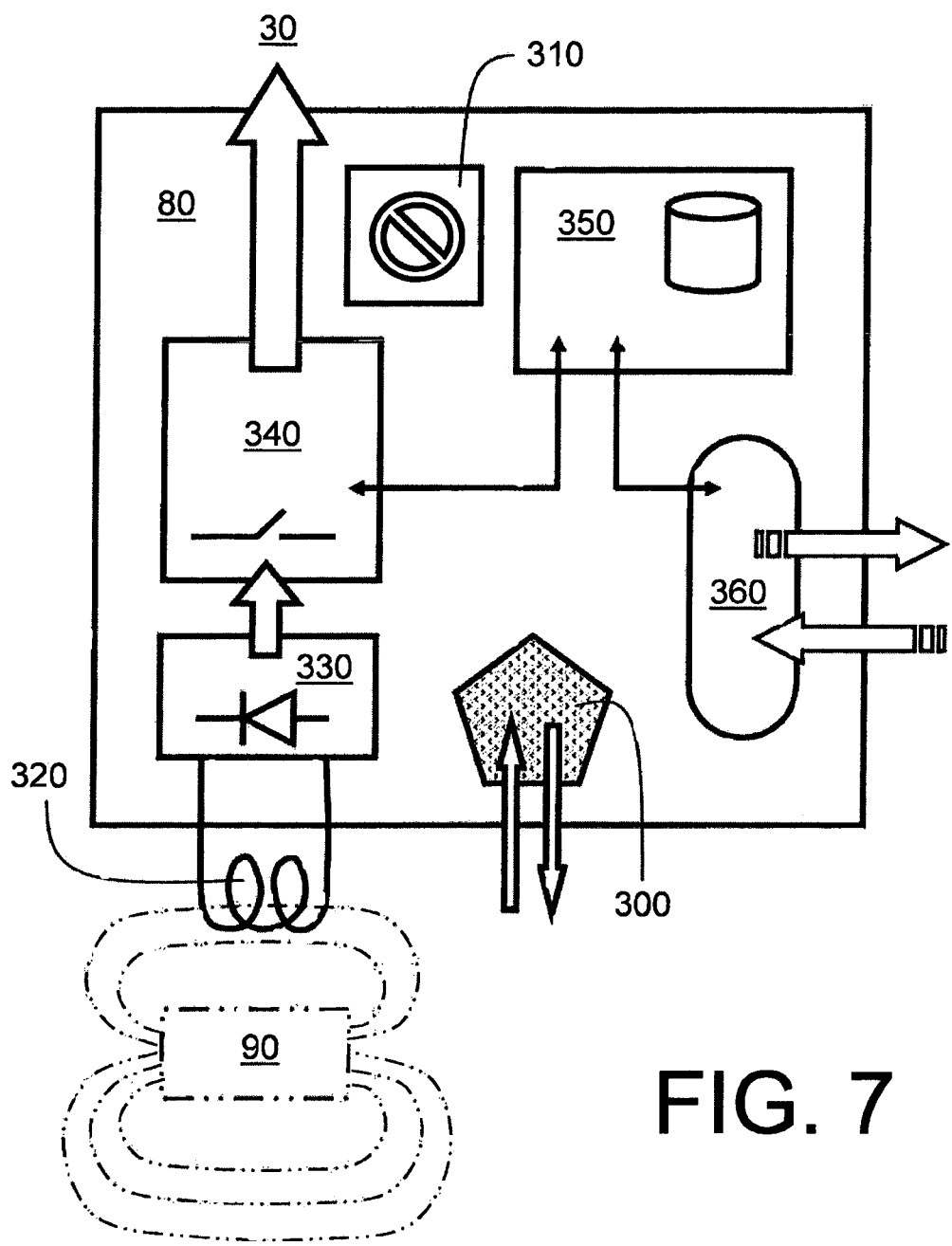
FIG. 7 is a schematic illustration of a module of a stator suitable for constructing a generator pursuant to the present invention.

The modules 80 will now be described in greater detail with reference to FIG. 7. Each module 80 is a self-contained wavelet 30 generator which can be mounted in a stacked configuration against other similar modules 80, or mounted onto supports of a supporting structure of the stator 60 as aforementioned. The module 80 is provided with a cooling arrangement 300, for example based upon circulated insulating silicone cooling oil and/or forced air cooling. Moreover, the module 80 also includes a releasable mounting arrangement 310 for enabling the module 80 to be adequately mechanically supported when exposed to various mechanical stresses when in operation; the mounting arrangement 310 beneficially includes screws, registration pins, rubber bushes and so forth. The module 80 includes a coil 320 for interacting with magnetic flux generated by magnets 90 of the rotor 50. An output of the coil 320 is coupled to a rectifier arrangement 330 and then via a switching network 340 to the wavelet output 30; the switching network 340 is designed to operate at relatively low switching frequencies corresponds to the duration d of the wavelets 30. Such operation is very different to conventional high-frequency pulse-width-modulated (PWM) electronic power conditioning circuits which are costly and energy inefficient due to high-frequency switching losses occurring at high frequencies in an order of kHz. Moreover, the module 80 also includes a bi-directional optical interface 360 for receiving control instruction from the control unit 70 and for output diagnostic data and/or confirmatory data to the control unit 70. The interface 360 is able to provide for rapid data rates as well as providing electrical isolation between modules 80 in a most robust and cost-effective manner. A microcontroller 350 controls operation of the module 80 at a local level; in practice, control of the generator 20 is beneficially executed in a distributed manner between the control unit 70 and the microcontrollers 350 of the modules 80. Moreover, the interface 360 is conveniently implemented using high-speed photodetectors and data-modulated solid-state laser devices. As aforementioned, the interface 360 is designed to receive and transmit at various different optical carrier radiation wavelengths, for example in a manner of wavelength division multiplexing (WDM), to enable a single general optical data highway to be used within the generator 20 to control operation of all the modules 80 of the generator 20. Optionally, a plurality of optical data highways can be employed in the generator 20, for example for emergency backup purposes in an event that a main optical data highway of the generator 20 becomes obscured for any reason. Each coil 320 and its associated electronic components are constructed as a stand alone mass-produced unit that can easily be replaced, for example even while in operation. The ability to construct the generator 20 as a large-diameter arrangement, or as a long small-diameter arrangement, also lends itself to integration into a wide range of conventional and exotic turbine designs without requiring its basic component parts to be re-designed. As aforementioned, all configurations of the generator 20 can have monopole or dipole magnetic setups with internal or external rotating magnets, for example as depicted in FIG. 2A, FIG. 2B and FIG. 2C.

Figure 8A:
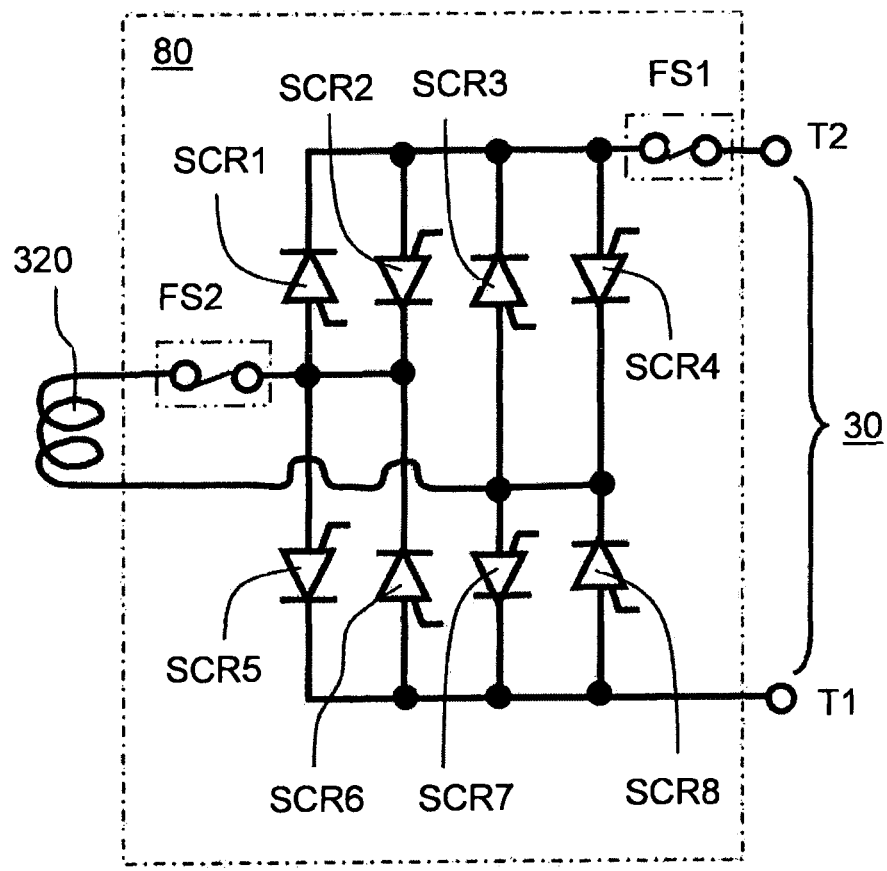
FIG. 8A is a schematic illustration of an embodiment of an electrical power circuit for use in modules of the invention.

Referring next to FIG. 8A, there is shown a representation of electronic switching components employed to implement the module 80. The module 80 can be implemented using a variety of electronic switching components, for example field effect transistors (FET), bipolar transistors (BJT), triacs, silicon controlled rectifiers (SCR), Darlington transistors, silicon carbide transistors, silicon germanium transistors, and so forth. Most preferable, on account of low cost and robustness, the module 80 is implemented using silicon controlled rectifiers SCR1 to SCR8 as illustrated. Silicon controlled rectifiers SCR are purchasable to have up to 2 kV blocking voltage performance, a current conducting performance of several thousand amperes and be packaged in flat ceramic capsules which are easily mechanically incorporated into the module 80. The silicon controlled rectifiers SCR include gate terminals which are triggered from the microcontroller 350 of the module 80; triggering of the silicon controlled rectifiers SCR is beneficially achieved via optical triggering and/or or via isolation ferrite pulse transformers. In operation, a silicon controlled rectifier SCR only conducts when triggered at its gate terminal. Moreover, conduction through a silicon controlled rectifier SCR ceases when a potential thereacross is smaller than a threshold magnitude or the silicon controlled rectifier SCR becomes reversed biased across its main two terminals. The module 80 in FIG. 8A has four conducting modes, namely:

(a) a first mode, wherein the module 80 provides effectively a short-circuit path between its terminals T1, T2;
(b) a second mode, wherein there is an open circuit between the terminals T1, T2;
(c) a third mode, wherein a negative wavelet 30 half-cycle is directed from the coil 320 to the terminals T1, T2; and
(d) a fourth mode, wherein a positive wavelet 30 half-cycle is directed from the coil 320 to the terminals T1, T2.

Beneficially, the module 80 includes a first safety fuse FS1 for isolating the entire module 80 in a situation of gross failure, and a second safety fuse FS2 for protecting the coil 320 in a situation of gross failure. The silicon controlled rectifiers SCR1 to SCR8 are arranged in a bridge-type configuration as illustrated in FIG. 8A. In the first mode, the silicon controlled rectifiers SCR3, SCR4, SCR7 and SCR8 are triggered into a conducting state, whereas the silicon controlled rectifiers SCR1, SCR2, SCR5 and SCR6 are in a non-conducting state. In the second mode, none of the silicon controlled rectifiers SCR1 to SCR8 are in a conducting state, namely they are all in an open-circuit state. In the third mode, the silicon controlled rectifiers SCR2 and SCR7 are in a conducting state, and the silicon controlled rectifiers SCR1, SCR3 to SCR6, and SCR8 are in a non-conducting state. In the fourth mode, the silicon controlled rectifiers SCR1 and SCR8 are in a conducting state, and the silicon controlled rectifiers SCR2 to SCR7 are in a non-conducting state.

Figure 8B:
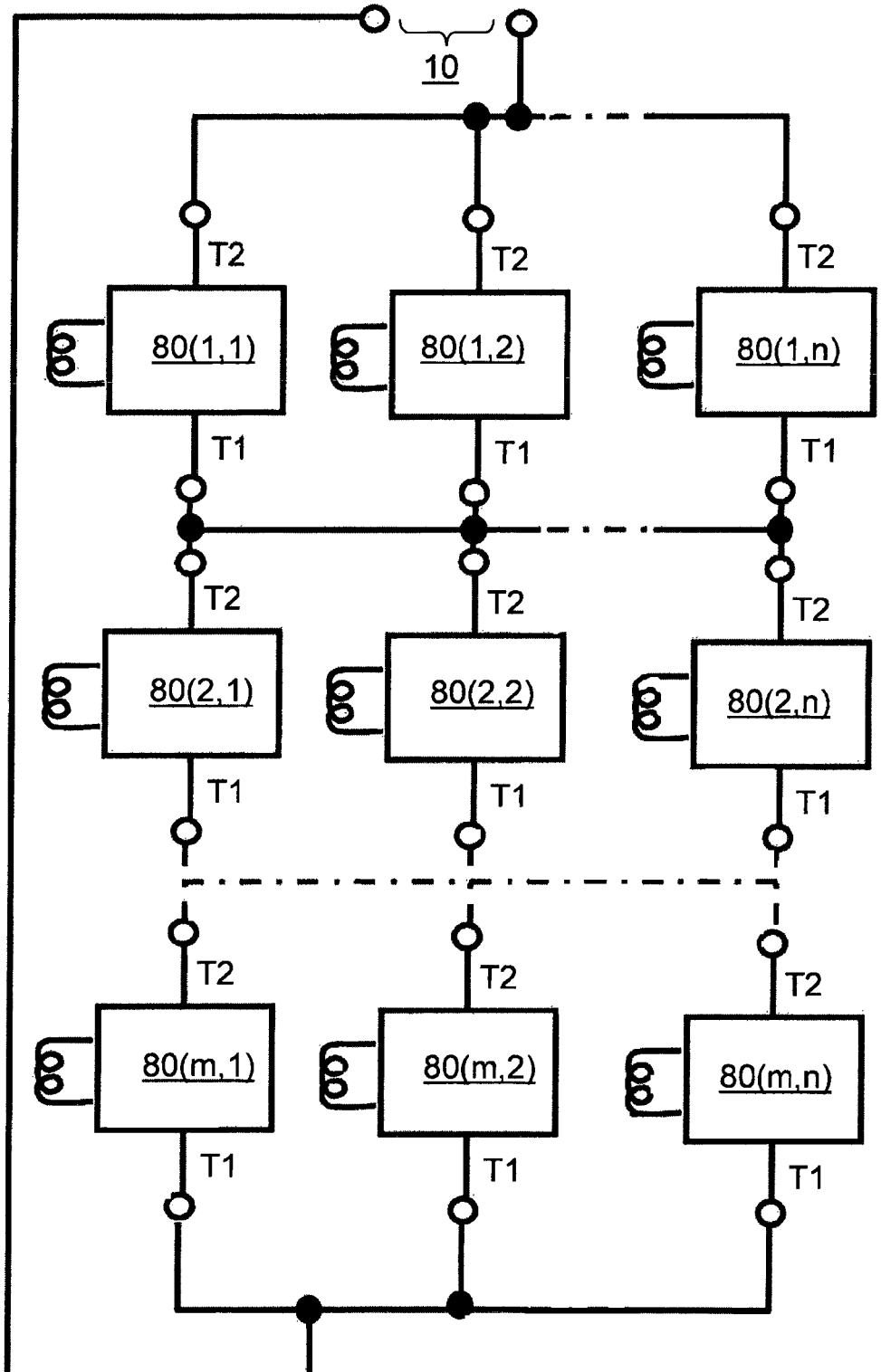
FIG. 8B is a schematic illustration of a matrix electrical connection arrangement of modules of the invention.

As illustrated in FIG. 8B, the modules 80 are beneficially coupled electrically together in a two-dimensional matrix including m×n modules 80. Certain of the modules 80 are optionally omitted from the matrix. By such an arrangement, current load can be shared between modules 80 coupled in parallel, and large potentials can be provided at the output 10 by the modules 80 being coupled in series. For example, if required, the output 10 can be many kV's in magnitude which potentially circumvents a need to interface the generator 20 via transformers to an electrical distribution grid, thereby saving installation cost and reducing energy losses. Optionally, the matrix includes several hundred modules 80 for synthesizing the output 10 as a sinusoidal signal with relatively little harmonic content, for example less than 1% harmonic content. As aforementioned, the modules 80 of the matrix optionally provide mutually different wavelet 30 amplitudes for enabling even more accurately synthesized waveforms to be synthesized for the output 10. However, it will be appreciated that the matrix can also be controlled to provide direct current DC output which can be fed directly to long-distance submerged ocean cables for reducing long-distance power transmission losses.

The variable generator 20 ("VVG") provides many intrinsic benefits in comparison to conventional approaches to generator construction. Conceptually, the variable generator 20, for example adapted for use in an offshore wind turbine for electrical power generation, can be considered to be a spatial collocation of small power plants that can be dynamically rearranged to combine their power outputs in various combinations to absorb energy from an electrical power network or supply energy to the electrical power network; such absorption or supply can be achieved by adjusting phase of the output 10 relative to phase of an electrical grid to which the generator 20 is coupled, namely by selecting time instances when the wavelets 30 are selectively added together to generate the output 10. Alternatively, or additionally, power absorption or power supply can also be controlled by modulating a magnitude of the output 10, namely by how many wavelets 30 that the control unit 70 elects to combine to synthesize its output waveform at the output 10. Situations where power absorption is desirable arise when an electrical grid is momentarily overloaded and power needs to be extracted from the grid to be stored in rotational inertia of the rotor of the wind turbine. A situation when power supply to the electrical grid is required is when numerous consumers are extracting power from the electrical power network. The generator 20, when used in an offshore wind turbine, is thus capable of providing electrical power output as well as very rapid electrical grid network demand response stabilization with a response time potentially within one mains electricity cycle. Such demand response stabilization is vastly more prompt than any pump storage systems which are conventionally used for electrical power grid stabilization; an example of a pump storage demand response stabilization facility is Dinorwig in Wales, United Kingdom. The generator 20 is thus highly suitable for use with smart grids (in USA, "supergrid").

In principle, various measured parameters can be used by the microcontrollers 350 and/or the control unit 70 to control the generator 20, or even a configuration of several generators 20 operating together in a coordinated manner. An example of a measured parameter is temperature within a given module 80, or number of hours a given generator 20 has been operating within a wind farm (for example, for uniformly distributing wear-and-tear amongst generators 20 to enhance overall operating reliability between servicing operations).

For example, referring to FIG. 9, a system 500 comprises several offshore wind turbines 510 equipped with variable generators 20 pursuant to the present invention. The system 500 is beneficially operated according to a method wherein a control centre 520 of the system 500 decides, by way of an independent decision, to start the wind turbines 510 in a western region 530 of the system 500, namely a wind "farm", first if the wind blows from a westerly direction; in other words, the system 500 activates those wind turbines 510 which are capable of generating energy most efficiently first. Beneficially, the control units 70 of the generators 20 employed within the system 500 are operable to maintain a temporal log of accumulative output power from the generators 20, for example for spreading wear-and-tear within the system 500 and/or for determining maintenance schedules for the system 500.

In another method of operation, the control centre 520 seeks to set in operation first a wind turbine 510 that has hitherto produced least output, for example in order to spread wear-and-tear and/or to prevent seldom-used mechanisms seizing up in corrosive offshore environments. The control centre 520 is optionally an automatic arrangement controlling the system 500 without a need for human intervention. Optionally, the control centre 520 is adaptive and refines its operating routines for the wind turbines 510 based upon feedback from monitoring the outputs 10 and from receiving information from maintenance activities.

Beneficially, control logic employed for the system 500 is based on a self-organizing neural control; this type of neural control means that the system 500 itself will at any given time decide an optimum operating scenario of a single generator 20 or a combination of generators 20 based on predetermined values set by an operator of the system 500. Any value desired by the operator can be integrated in a control algorithm employed for a single unit or the entire system 500. An example could be to operate the system 500 in such a way that it maximizes output but minimizes maintenance, and additionally minimizes temperature in the individual components of the electronic subunits, and so forth. Other measures could, for instance, be to optimize power output of a generator 20 of the system 500, or the entire system 500, but allow optimized power to be overridden by responsive load demands exhibited by an electrical power grid coupled to the system 500. Beneficially, automatic system compensation is adopted by the system 500 in an event that one or more of the generators 20 or their associated wind turbines 510 fail, experience seasonal variations, and so forth.

Methods of making decision are beneficially based on criteria which are decided and weighted by an operator of the system 500; these methods allow the system 500 to prioritize independently in real time based on whatever system operating effects are desired. The system 500 could, for example, be instructed to maintain absolute voltage and frequency control at its point of delivery at any given time, or even compensate/counteract noise on the electric power grid if this is desired.

The generators 20 are beneficially susceptible to being adapted to smart unit and smart grid scenarios.

If an individual wind turbine 510 experiences a gust of wind that could potentially create a short unwanted power boost onto an electrical distribution grid coupled to the turbine 510, the generator 20 of the wind turbine 510 is beneficially operable to counteract an electrical power surge resulting from the boost by enabling a rotor of the wind turbine 510 to accelerate so that energy of the gust is converted to rotational kinetic energy of the rotor. This operating characteristic is capable of enabling a more stable electrical supply grid to be achieved. In a coordinated scenario, in an event that a base load in the grid suddenly drops by 100 MW, for example everyone unplugs their electric automobiles to drive to work, a wind turbine farm employing generators 20 and producing 100 MW at the time could instantaneously switch and in reality produce momentarily 100 MW of additional power by decelerating rotors of the wind turbines 510. Such an approach reduces a need for short-term load shedding to be implemented within the electrical distribution grid. The system 500 beneficially continually adjusts itself and failure in any individual component or unit therein will have a negligible effect on the overall performance of the system 500. If a component fails in the system 500, the only negative effect would be a power loss equal to the failed component. This is a very useful feature, especially if the production unit is placed in a remote area, offshore or underwater and the next planned maintenance interval is a long time off. Not only can the generator 20 adapt in real time to noise or unbalanced loads, but it can also act as an instantaneous load shedder equal at any given time to the instantaneous power produced by the system 500 either in an individual production unit or distributed across a number of independent production units.

The generator 20 is optionally susceptible to being modified to function as a component part of a linear generator for converting reciprocating linear motion resulting from combustion processes to electrical energy, for example as a component part of an apparatus as described in granted European patent EP0772735B1. In renewable energy systems, reciprocating linear motion also arises as a consequence of floats bobbing up and down on ocean waves, and in oscillating-vane wind energy devices; such motion is also beneficially converted to electrical energy using the generator 20. In FIG. 10, the stator 60 is shown disposed in a linear planar matrix, optionally a skewed or irregular matrix, for interfacing to a linear reciprocating "rotor" 50 equipped with a plurality of magnets 90.

Although inclusion of the magnets 90 in the rotor 50 and coils 320 in the stator 60 are described in the foregoing, it will be appreciated that each of the stator 60 and rotor 50 optionally include both magnets 90 and coils 320 in a hybrid type of arrangement. Optionally, slip rings and/or magnetic inductive couplings can be used for transferring generated power.

Although use of the generator 20 in renewable energy systems is described most in the foregoing, it will be appreciated that the generator 20 can be adapted for use in more convention installations, for example:
(a) in hydroelectric facilities;
(b) in conjunction with steam turbines of coal, nuclear, gas, solar and geothermal power stations.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A variable electrical generator (20) for converting mechanical motion to electrical power, wherein the generator (20) includes at least a stator element (60) and a rotor element (50) including coils (320) and magnets (90), wherein the generator (20) includes a configuration of modules (80) including the coils (320) for generating wavelets (30) in response to the coils (320) interacting magnetically with the magnets (90), and wherein the modules (80) are operable to generate wavelets (30) whose duration (d) is shorter than a duration of cycle (D) of an alternating waveform supplied in operation to the output (10), and a control arrangement (70) for selectively combining the wavelets (30) for generating a composite synthesized power output (10) from the generator (20).

2. A variable electrical generator (20) as claimed in claim 1, wherein the modules (80) are spatially collocated with their corresponding coils (320).

3. A variable electrical generator (20) as claimed in claim 1, wherein the stator (60) includes coils (320) and is arranged to remain substantially stationary in operation, and the rotor (50) includes magnets (90) and is arranged to rotate and/or reciprocate in operation relative to the stator (60).

4. A variable electrical generator (20) as claimed in claim 1, wherein the modules (80) are electrically coupled together in a two-dimension switching matrix including at least one series path for adding potentials of the wavelets (30), and at least one parallel path for current spreading between wavelets (30), for generating the output (10).

5. A variable electrical generator (20) as claimed in claim 1, wherein the modules (80) are operable to switch between a non-conductive state, a shorted state, a negative wavelet state and a positive wavelet state when in operation in response to control signals provided from the control arrangement (70, 80).

6. A variable electrical generator (20) as claimed in claim 1, wherein the modules (80) are coupled in communication with the control arrangement (70, 80) via an optical data highway (360) which is operable to selectively direct data between the control arrangement (70) and the modules (80) by way of wavelength division multiplexing and wherein the modules (80) are operable to communicate diagnostic signals regarding their operating status to the control arrangement (70), and to receive control signals from the control arrangement (70) concerning timing information and/or polarity information in respect of their respective wavelets (30).

7. A variable electrical generator (20) as claimed in claim 1, wherein said modules (80) are arranged to be unplugged and plugged into their respective positions on the stator (60) and/or rotor (50).

8. A variable electrical generator (20) as claimed in claim 1, wherein the modules (20) include solid state switching devices (330, 340) for switching at least half-cycles of induced electrical signals induced within the coils (320) in operation.

9. A variable electrical generator (20) as claimed in claim 1, wherein the control arrangement (70) includes an input for use as a reference when synchronizing and/or adjusting an amplitude and/or phase of the output (10) during operation.

10. A module (80) for use in a variable generator (20) as claimed in claim 1, wherein the module (80) includes a microcontroller (350) for providing local control of the module (80), a coil (320) coupled to a switching arrangement (330, 340) for generating wavelets (30) under control of the microcontroller (350), and an optical communication interface (260) for receiving control data for controlling the module (80) and/or for communicating diagnostic information from the module (80).

11. A method of using a variable electrical generator (20) for converting mechanical motion to electrical power, wherein the generator (20) includes at least a stator element (60) and a rotor element (50) including coils (320) and magnets (90), wherein the method comprises:
   (a) generating wavelets (30) whose duration (d) is shorter than a duration of cycle (D) of an alternating waveform supplied in operation to the output (10), in a configuration of modules (80) including the coils (320) for generating wavelets (30) in response to the coils (320) interacting magnetically with the magnets (90); and
   (b) using a control arrangement (70) to selectively combine the wavelets (30) for generating a composite synthesized power output (10) from the generator (20).

12. A renewable energy system (500) for converting linear and/or rotating motion of mechanical apparatus (510) into electrical energy, wherein the apparatus (500) is operable to cause relative movement between a rotor (50) and a stator (60) of a variable generator (20) as claimed in claim 1 for generating a power output (10) from the system (500).

13. A renewable energy system (500) as claimed in claim 12, wherein said mechanical apparatus includes at least one of: a tidal water turbine, a wind turbine, an oscillating wind vane, an ocean float, a hydroelectric turbine, a steam turbine.

14. A method of maintaining a variable generator (20) as claimed In claim 1, comprising the steps of:
   (a) determining operating status of modules (80) of the generator (20); and
   (b) unplugging and replacing one or more defective modules (80) as identified in step (a).

15. A method of providing responsive load stabilization to an electrical distribution grid by using a variable electrical generator (20) as claimed in claim 1, the generator (20) being coupled to the grid, wherein the method comprises:
   (a) sensing one or more parameters indicative of a degree of electrical loading being experienced by the grid; and
   (b) adjusting wavelet (30) selection in the generator (20) to absorb or inject electrical power into the grid so as to assist to stabilize the grid against deviations in voltage and/or frequency of said grid resulting from said degree of electrical loading.

* * * * *